(12) United States Patent
Tosey

(10) Patent No.: US 7,251,823 B2
(45) Date of Patent: Jul. 31, 2007

(54) ENTERPRISE ACCESS CONFIGURATION

(75) Inventor: Joseph Peter Robert Tosey, North Vancouver (CA)

(73) Assignee: Sierra Wireless, Inc., Richmond, BC (CA)

( * ) Notice: Subject to any disclaimer, the term of this patent is extended or adjusted under 35 U.S.C. 154(b) by 861 days.

(21) Appl. No.: 10/323,138

(22) Filed: Dec. 17, 2002

(65) Prior Publication Data

US 2004/0117656 A1    Jun. 17, 2004

(51) Int. Cl.
*G06F 9/30*    (2006.01)
*G06F 17/30*   (2006.01)
*G06F 15/177*  (2006.01)

(52) U.S. Cl. .................. 726/3; 726/14; 726/27; 709/220; 709/222

(58) Field of Classification Search .............. None
See application file for complete search history.

(56) References Cited

U.S. PATENT DOCUMENTS 6,286,038 B1 * 9/2001 Reichmeyer et al. ....... 709/220

2001/0044903 A1 * 11/2001 Yamamoto et al. ......... 713/200
2002/0198969 A1 * 12/2002 Engel et al. ................ 709/220
2004/0193695 A1 *  9/2004 Salo et al. .................. 709/216

FOREIGN PATENT DOCUMENTS

WO    WO 00/31931    6/2000

OTHER PUBLICATIONS

International Search Report, dated Jul. 15, 2004, PCT/CA03/01964.

* cited by examiner

*Primary Examiner*—Gilberto Barrón, Jr.
*Assistant Examiner*—Brandon Bludau
(74) *Attorney, Agent, or Firm*—Thelen Reid Brown Raysman & Steiner LLP

(57) ABSTRACT

The present invention provides a solution in which a script containing general security parameters and access policies in a file is placed on an appropriate internal server. The location of the script may then be stored on an external server. When an end-user within the organization decides to purchase a wireless network device, he may attach it to his existing computer. The computer then may retrieve the security file location from the external server, retrieve the security file from the internal server using the security file location, and program the security file into the wireless device.

46 Claims, 5 Drawing Sheets

ENTERPRISE ACCESS CONFIGURATION

FIELD OF THE INVENTION

The present invention relates to the field of computer networks. More particularly, the present invention relates to enterprise access configuration for wireless remote email access.

BACKGROUND OF THE INVENTION

Mobile devices, such as cellular phones and personal digital assistants (PDAs) have been growing in popularity for many years. Laptop computers have been popular for many years. Recently, wireless email access has been made available for laptop computers, cellular phones, and personal digital assistants. With wireless email access, a user may send and receive email remotely using a wireless Internet connection.

Enterprise users are potentially a huge market for wireless email access. Enterprises, such as large companies, have a high need for instant communication and commonly business is conducted via email. There are currently two broad categories of solutions for wireless remote email access. Both, however, cause significant problems for enterprises.

In the first scenario, an end-user purchases a wireless device to use in conjunction with a desktop computer. Wireless email redirector software is placed on the desktop. This software monitors mail that comes into the mail server destined for the user's mailbox, and then securely forwards it to his device. This solution, however, is not under control of the enterprise. For example, the enterprise may have internal policies that require the deletion of received email after 90 days. When the email is redirected to a wireless device, the enterprise can no longer ensure that the email is deleted after 90 days. Another drawback of this first scenario is that it only works for email. Furthermore, it requires that a desktop computer be left behind. This, however, is not possible for professionals who use a single laptop computer at the office and when they travel.

In the second scenario, an enterprise Information Technology (IT) manager selects and installs a solution for end-users. This entails either a dedicated mail server process or integration with a hosted Active Server Pages (ASP) service. A mail server, however, is a major IT project, possibly requiring a new dedicated forwarding server, an email server upgrade, and installation of other significant applications. For example, an email server using Microsoft™ approach requires the installation of ActiveDirectory and Exchange 2000 before installing their Mobile Information Server. It also is quite expensive. Furthermore, a hosted service may require a new supplier relationship. There also may need to be a complicated connection between the remote access provider and the wireless ASP service. Complex mail routing is required, introducing potential security risks. This solution also works only for email.

What is needed is a solution that allows an IT manager to prepare an organization for easy and secure wireless email access, with minimal investment of time or money.

BRIEF DESCRIPTION OF THE INVENTION

The present invention provides a solution in which a script containing general security parameters and access policies in a file is placed on an appropriate internal server. The location of the script may then be stored on an external server. When an end-user within the organization decides to purchase a wireless network device, he may attach it to his existing computer. The computer then may retrieve the security file location from the external server, retrieve the security file from the internal server using the security file location, and program the security file into the wireless device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention provides a solution in which a script containing general security parameters and access policies in a file is placed on an appropriate internal server. The location of the script may then be stored on an external server. When an end-user within the organization decides to purchase a wireless network device, he may attach it to his existing computer. The computer then may retrieve the security file location and/or the security file access protocol from the external server, retrieve the security file from the internal server using the security file location and/or the security file access protocol, and program the security file into the wireless device.

Figure 1:
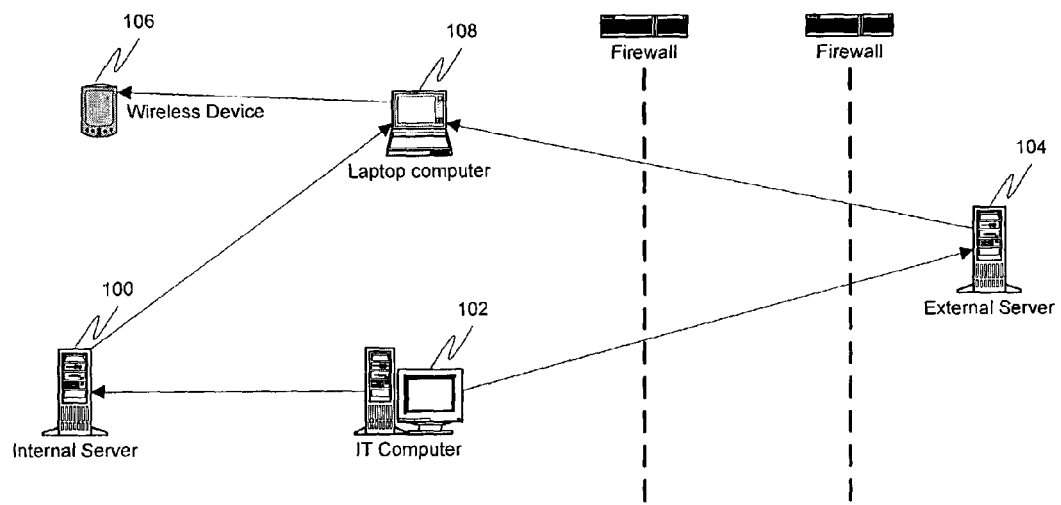
FIG. 1 is a diagram illustrating a system in accordance with a specific embodiment of the present invention.

FIG. 1 is a diagram illustrating a system in accordance with a specific embodiment of the present invention. A person capable of understanding the remote access procedures and security parameters for an organization (for purposes of this application, known as an "IT manager") may place a script containing general security parameters and access policies in a file on an appropriate internal server 100 using an IT computer 102. The file may have read-only access to prevent unauthorized changes. A "wizard" may be provided to simplify the creation of this configuration script. Many different types of servers may be used as an internal sever 100 including, but not limited to, file servers, database servers, or web servers.

The location of the script may then be stored on an external server 104. This server may be owned by any of a variety of companies. The location may be represented through a Microsoft UNC, Internet URL, and XQL database query or any other means appropriate to identify the server and file. Each file may be associated with an email domain that covers email addresses routed to the organization (e.g., "@company.com"). The security file access protocol may also be stored on the external sever 104.

Independently, an end-user within the organization may decide to purchase a wireless network device 106 that he desires to access email with. He may query the external server 104 to determine whether his email address is supported. If so, he may purchase the wireless network device and attach it to a laptop behind a firewall. At this time, if the email address is not supported, the operator of the external server may decide to support the email address by configuring the system to work with the email address. For example, the user may have email address of employee@company.com. If a previous employee with that company was configured to work with the system, then it may be that all employees with that company have been configured and all that is necessary is for the user to retrieve that configuration. However, if this is the first employee with that company to attempt access, the external server may configure that employee, at which point all employees with the email domain company.com will be configured.

The laptop 108 may then retrieve the security file location and/or security file access protocol from the server, retrieve the security file, and then program the security file into the wireless device, which has been coupled to the laptop. He also may then enter the remaining personal security parameters (e.g., personal account name and password). The device may now access the corporate network directly when outside the firewall, using these parameters. This solution allows any form of access to be configured: push messaging, enterprise-based instant messaging, intranet web browsing, intranet file access, intranet application access, virtual private network (VPN) access, VPN key distribution, etc.

Figure 2:
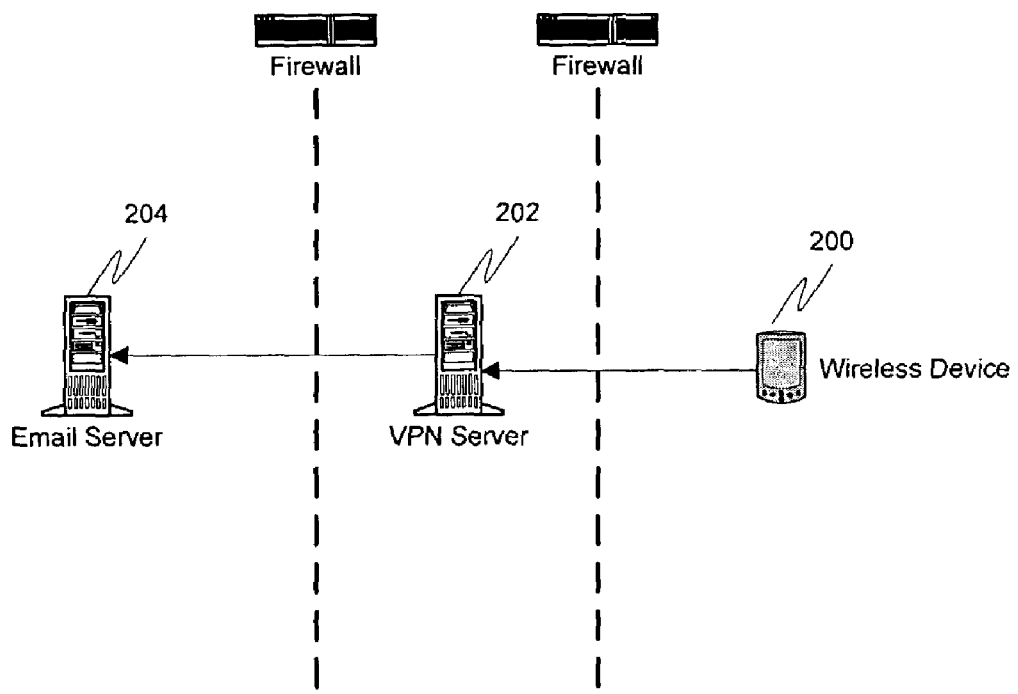
FIG. 2 is a diagram illustrating a system for accessing an enterprise in accordance with an embodiment of the present invention.

FIG. 2 is a diagram illustrating a system for accessing an enterprise in accordance with an embodiment of the present invention. After the wireless device 200 has been configured, email access may be coordinated using a virtual private network (VPN) server 202 which allows access to an email server 204.

Figure 3:
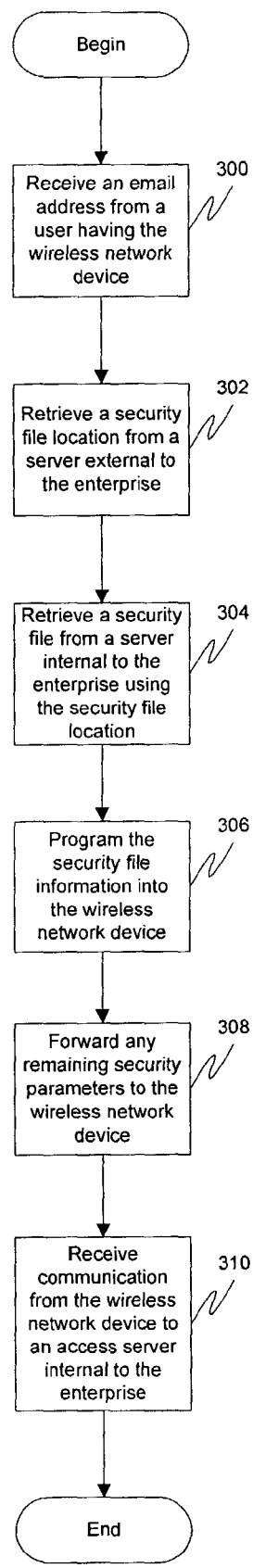
FIG. 3 is a flow diagram illustrating a method for configuring access from a wireless network device to an enterprise in accordance with an embodiment of the present invention.

FIG. 3 is a flow diagram illustrating a method for configuring access from a wireless network device to an enterprise in accordance with an embodiment of the present invention. At 300, an email address may be received from a user having the wireless network device. This email address may then be checked against a database having domains currently supported by the enterprise to determine whether a security file exists. If one does not, the system may choose to deny the request for access or to create a security file unique to a domain covering the email address. At 302, a security file location and/or a security file access protocol may be retrieved from a server external to the enterprise. At 304, a security file may be retrieved from a server internal to the enterprise using the security file location and/or the security file access protocol. The server internal to the enterprise may be, for example, a web server, file server, database server, etc. At 306, the security file may be programmed into the wireless network device. At 308, any remaining security parameters may be forwarded to the wireless network device. At 310, communication may be received from the wireless network device to an access server internal to the enterprise, the communication sent using a configuration stored in the security file. The access server may be, for example, an email server, a push messaging server, an instant messaging server, an intranet web browsing server, an intranet file access server, and intranet application access server, a virtual private network (VPN) access server, a VPN key distribution server, etc.

Figure 4:
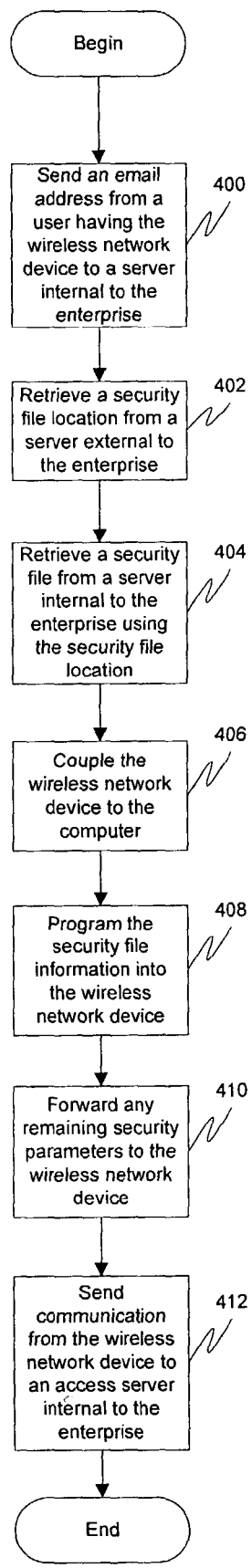
FIG. 4 is a flow diagram illustrating a method for accessing an enterprise from a wireless network device using a computer, in accordance with an embodiment of the present invention.

FIG. 4 is a flow diagram illustrating a method for accessing an enterprise from a wireless network device using a computer, in accordance with an embodiment of the present invention. At 400, an email address from a user having the wireless network device may be sent to a server internal to the enterprise. This allows the server to verify whether a security file for the domain covering the user's email address exists, and if not, create one. At 402, a security file location and/or a security file access protocol may be retrieved from a server external to the enterprise. At 404, a security file may be retrieved from a server internal to the enterprise using the security file location and/or security file access protocol. The server internal to the enterprise may be, for example, a web server, file server, database server, etc. At 406, the wireless network device may be coupled to the computer. At 408, the security file may be programmed into the wireless network device. At 410, any remaining security parameters may be forwarded to the wireless network device. At 412, communication may be sent from the wireless network device to an access server internal to the enterprise, the communication sent using a configuration stored in the security file. The access server may be, for example, an email server, a push messaging server, an instant messaging server, an intranet web browsing server, an intranet file access server, and intranet application access server, a virtual private network (VPN) access server, a VPN key distribution server, etc.

Figure 5:
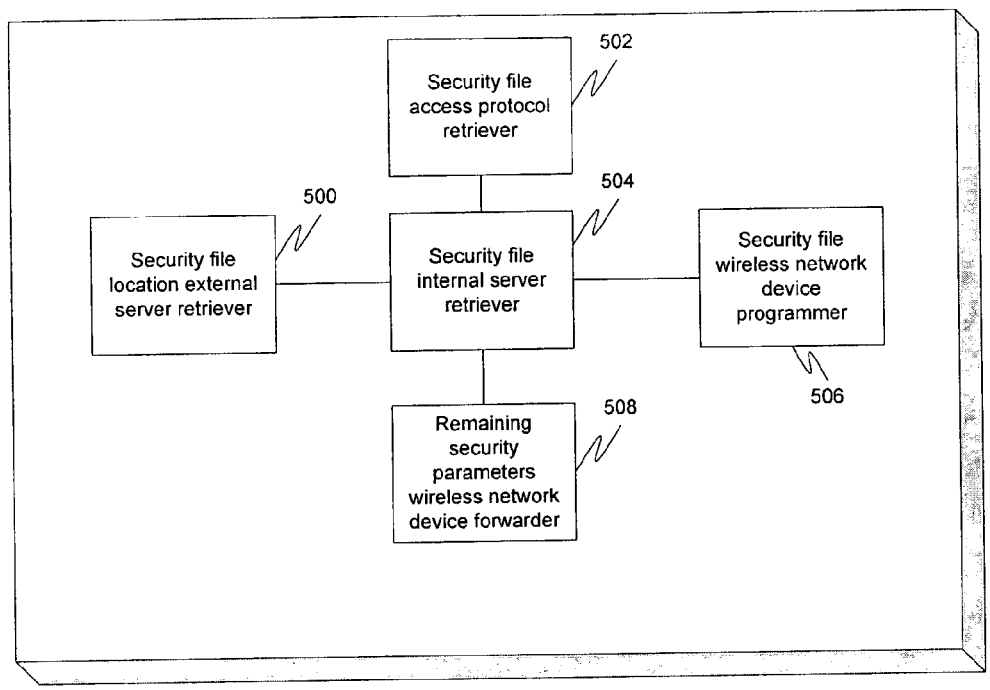
FIG. 5 is a block diagram illustrating an apparatus for configuring access from a wireless network device to an enterprise in accordance with an embodiment of the present invention.

FIG. 5 is a block diagram illustrating an apparatus for configuring access from a wireless network device to an enterprise in accordance with an embodiment of the present invention. A security file location external server retriever 500 may retrieve a security file location from a server external to the enterprise. A security file access protocol retriever 502 may retrieve a security file access protocol from the server external to the enterprise. A security file internal server retriever 504 coupled to the security file location external server retriever 500 and to the security file access protocol retriever 502 may retrieve a security file from a server internal to the enterprise using the security file location and/or the security file access protocol. The server internal to the enterprise may be, for example, a web server, file server, database server, etc. A security file wireless network device programmer 506 coupled to the security file internal server retriever 504 may program the security file into the wireless network device. A remaining security parameters wireless network device forwarder 508 coupled to the security file internal server retriever 504 may forward any remaining security parameters to the wireless network device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for configuring access from a wireless network device to an enterprise, comprising:
   retrieving a security file location from a server external to the enterprise;
   retrieving a security file from a server internal to the enterprise using said security file location;
   programming said security file into the wireless network device; and
   forwarding any remaining security parameters to the wireless network device.

2. The method of claim 1, further comprising:
   retrieving a security file access protocol from said server external to the enterprise.

3. The method of claim 2, wherein said retrieving a security file further includes retrieving a security file from a server internal to the enterprise using said security file location and said security file access protocol.

4. The method of claim 1, further comprising:
   receiving an email address from a user having the wireless network device; and
   wherein said security file is unique to a domain covering said email address.

5. The method of claim 1, wherein said server internal to the enterprise is a web server.

6. The method of claim 1, wherein said server internal to the enterprise is a file server.

7. The method of claim 1, wherein said server internal to the enterprise is a database server.

8. The method of claim 1, further comprising:
   receiving communication from said wireless network device to an access server internal to the enterprise, the communication sent using a configuration stored in said security file.

9. The method of claim 8, wherein said access server is an email server.

10. The method of claim 8, wherein said access server is a push messaging server.

11. The method of claim 8, wherein said access server is an instant messaging server.

12. The method of claim 8, wherein said access server is an intranet web browsing server.

13. The method of claim 8, wherein said access server is an intranet file access server.

14. The method of claim 8, wherein said access server is an intranet application access server.

15. The method of claim 8, wherein said access server is a virtual private network (VPN) access server.

16. The method of claim 8, wherein said access server is a VPN key distribution server.

17. A method for accessing an enterprise from a wireless network device by using a computer, comprising:
   retrieving a security file location from a server external to the enterprise;
   retrieving a security file from a server internal to the enterprise using said security file location;
   coupling the wireless network device to the computer; and
   programming said security file into the wireless network device.

18. The method of claim 17, further comprising:
   retrieving a security file access protocol from said server external to the enterprise.

19. The method of claim 18, wherein said retrieving a security file further includes retrieving a security file from a server internal to the enterprise using said security file location and said security file access protocol.

20. The method of claim 17, further comprising:
   forwarding any remaining security parameters to the wireless network device.

21. The method of claim 17, further comprising:
   sending an email address from a user having the wireless network device to a server internal to the enterprise.

22. The method of claim 17, further comprising:
   sending communication from the wireless network device to an access server internal to the enterprise, the communication sent using a configuration stored in said security file.

23. A computer system for configuring access from a wireless network device to an enterprise, comprising:
   means for retrieving a security file location from a server external to the enterprise;
   means for retrieving a security file from a server internal to the enterprise using said security file location;
   means for programming said security file into the wireless network device; and
   means for forwarding any remaining security parameters to the wireless network device.

24. The computer system of claim 23, further comprising:
   means for retrieving a security file access protocol from said server external to the enterprise.

25. The computer system of claim 24, wherein said means for retrieving a security file further includes means for retrieving a security file from a server internal to the enterprise using said security file location and said security file access protocol.

26. The computer system of claim 23, further comprising:
   means for receiving an email address from a user having the wireless network device; and means for wherein said security file is unique to a domain covering said email address.

27. The computer system of claim 23, wherein said server internal to the enterprise is a web server.

28. The computer system of claim 23, wherein said server internal to the enterprise is a file server.

29. The computer system of claim 23, wherein said server internal to the enterprise is a database server.

30. The computer system of claim 23, further comprising:
   means for receiving communication from said wireless network device to an access server internal to the enterprise, the communication sent using a configuration stored in said security file.

31. The computer system of claim 30, wherein said access server is an email server.

32. The computer system of claim 30, wherein said access server is a push messaging server.

33. The computer system of claim 30, wherein said access server is an instant messaging server.

34. The computer system of claim 30, wherein said access server is an intranet web browsing server.

35. The computer system of claim 30, wherein said access server is an intranet file access server.

36. The computer system of claim 30, wherein said access server is an intranet application access server.

37. The computer system of claim 30, wherein said access server is a virtual private network (VPN) access server.

38. The computer system of claim 30, wherein said access server is a VPN key distribution server.

39. A computer system for accessing an enterprise from a wireless network device by, comprising:
    means for retrieving a security file location from a server external to the enterprise;
    means for retrieving a security file from a server internal to the enterprise using said security file location;
    means for coupling the wireless network device to a computer; and
    means for programming said security file into the wireless network device.

40. The computer system of claim 39, further comprising: means for retrieving a security file access protocol from said server external to the enterprise.

41. The computer system of claim 40, wherein said means for retrieving a security file further includes means for retrieving a security file from a server internal to the enterprise using said security file location and said security file access protocol.

42. The computer system of claim 39, further comprising: means for forwarding any remaining security parameters to the wireless network device.

43. The computer system of claim 39, further comprising: means for sending an email address from a user having the wireless network device to a server internal to the enterprise.

44. The computer system of claim 39, further comprising: means for sending communication from the wireless network device to an access server internal to the enterprise, the communication sent using a configuration stored in said security file.

45. A program storage device readable by a machine, comprising a program of instructions executable by the machine to perform a method for configuring access from a wireless network device to an enterprise, the method comprising:
    retrieving a security file location from a server external to the enterprise;
    retrieving a security file from a server internal to the enterprise using said security file location;
    programming said security file into the wireless network device; and
    forwarding any remaining security parameters to the wireless network device.

46. A program storage device readable by a machine, comprising a program of instructions executable by the machine to perform a method for accessing an enterprise from a wireless network device by using a computer, the method comprising:
    retrieving a security file location from a server external to the enterprise;
    retrieving a security file from a server internal to the enterprise using said security file location;
    coupling the wireless network device to the computer; and
    programming said security file into the wireless network device.

* * * * *